US007937070B2

(12) United States Patent
Stendal

(10) Patent No.: US 7,937,070 B2

(45) Date of Patent: May 3, 2011

(54) LOCKING SYSTEM AND A METHOD AT A LOCKING SYSTEM

(75) Inventor: Fredrik Stendal, Västerås (SE)

(73) Assignee: Steab Stendal El AB, Vasteras (SE)

( * ) Notice: Subject to any disclaimer, the term of this patent is extended or adjusted under 35 U.S.C. 154(b) by 850 days.

(21) Appl. No.: 11/574,897

(22) PCT Filed: Sep. 5, 2005

(86) PCT No.: PCT/SE2005/001281

§ 371 (c)(1),
(2), (4) Date: Mar. 8, 2007

(87) PCT Pub. No.: WO2006/031173

PCT Pub. Date: Mar. 23, 2006

(65) Prior Publication Data

US 2008/0057905 A1 Mar. 6, 2008

(30) Foreign Application Priority Data

Sep. 16, 2004 (SE) ........................................ 0402263

(51) Int. Cl.
*H04M 1/66* (2006.01)

(52) U.S. Cl. ........ 455/411; 455/41.2; 370/338; 340/5.7; 340/5.61; 340/5.1

(58) Field of Classification Search .................. 370/338; 340/5.7, 5.61, 5.1

See application file for complete search history.

(56) References Cited

U.S. PATENT DOCUMENTS

| | | | | |
|---|---|---|---|---|
| 4,788,542 | A | 11/1988 | Tanabe | |
| 4,931,789 | A | 6/1990 | Pinnow | |
| 5,602,536 | A | 2/1997 | Henderson et al. | |
| 5,933,086 | A | 8/1999 | Tischendorf et al. | |
| 6,317,025 | B1 | 11/2001 | Leon et al. | |
| 6,550,010 | B1 * | 4/2003 | Link et al. | 713/168 |
| 6,678,516 | B2 * | 1/2004 | Nordman et al. | 455/414.1 |
| 7,089,035 | B2 * | 8/2006 | Ando et al. | 455/557 |
| 7,227,444 | B2 * | 6/2007 | Fitzgibbon | 340/5.24 |
| 7,389,123 | B2 * | 6/2008 | Rydgren et al. | 455/550.1 |
| 2004/0002354 | A1 * | 1/2004 | Nagano | 455/550.1 |
| 2004/0036625 | A1 * | 2/2004 | Omata et al. | 340/825.69 |
| 2004/0113753 | A1 * | 6/2004 | Chen | 340/5.7 |
| 2005/0088279 | A1 * | 4/2005 | Denison et al. | 340/5.23 |
| 2005/0210283 | A1 * | 9/2005 | Kato | 713/200 |
| 2005/0237166 | A1 * | 10/2005 | Chen | 340/426.13 |

OTHER PUBLICATIONS

International Search Report from corresponding International Application PCT/SE2005/001281.

* cited by examiner

*Primary Examiner* — Jinsong Hu
*Assistant Examiner* — Qun Shen
(74) *Attorney, Agent, or Firm* — WRB-IP LLP

(57) ABSTRACT

A locking system includes at least one electrical locking member for a door and at least one key member. Each electrical locking member is associated with a first communication member for wireless communication over short distances, and each key member includes a programmable, mobile unit including a second communication member for wireless communication over short distances. The electrical locking member is unlocked or locked by the fact that the second communication member encryptedly transmits an address unique to the second mobile unit, as well as an authorized user code to the first communication member.

25 Claims, 7 Drawing Sheets

LOCKING SYSTEM AND A METHOD AT A LOCKING SYSTEM

BACKGROUND AND SUMMARY

The present invention relates, according to a first aspect, to a locking system.

According to a second aspect, the present invention relates to a method for wireless unlocking or locking of one or more locking members.

According to a third aspect, the present invention relates to at least one computer software p At present, traditional metal keys and/or passes are used to open locks in connection with doors. Upon usage of passes, the same is frequently combined with the usage of a code. This represents a problem in that a great a number of keys and/or passes with accompanying codes may be required.

A locking system according to an aspect of the present invention comprises at least one electrical locking member, each of which intended for a door/garage door or the like and at least one key member. Each electrical locking member is associated with a first communication member for wireless communication over short distances. Each key member comprises a programmable, mobile unit comprising a second communication member for wireless communication over short distances. The electrical locking member is unlocked or locked by the fact that the second communication member encryptedly transmits an address unique to the mobile unit, as well as an authorized user code to the first communication member.

A significant advantage of this locking system according to an aspect of the present invention is that it is possible to use a mobile unit in order to lock or unlock many locks, which entails a great number of metal keys and/or passes are not needed. Furthermore, the use of a great number of codes is avoided.

In this connection, it is an advantage if the locking system furthermore comprises a central processing unit connected to each electrical locking member, which central processing unit comprises a memory member for the storage of the unique addresses of the mobile units as well as authorized user codes, and informs the locking members when they should be opened or locked.

An additional advantage, in this connection, is if each first communication member is connected to a first memory member for the storage of the unique addresses of the mobile units and authorized user codes.

In this connection, it is an advantage if each electrical locking member furthermore is associated with a comparing member connected to the first communication member and the first memory member for the comparison of the agreement between address as well as user code received from the second communication member and address as well as user code in the first memory member.

An additional advantage, in this connection, is if the electrical locking member remains in locked state when the comparing member does not establish agreement.

In this connection, it is an advantage if the first and the second communication member, respectively, communicate by means of Bluetooth technology.

An additional advantage, in this connection, is if each programmable, mobile unit comprises a selecting member operable to select one of three different operating modes of said mobile unit.

In this connection, it is an advantage if, in the first operating mode, the mobile unit searches for electrical locking members, and if more than one electrical locking member is registered in a second memory member included in each mobile unit, a list is displayed on a display member included in each mobile unit, the user from the same list selecting which electrical locking member that should be unlocked or locked.

An additional advantage, in this connection, is if, in the second operating mode, the mobile unit automatically searches for electrical locking members that are registered in a second memory member included in each mobile unit at a predetermined time interval, T, when the mobile unit finds at least one electrical locking member within a predetermined distance, d, from the mobile unit, the mobile unit displaying on a display member included in each mobile unit a question if the locking member/members found should be unlocked or locked.

In this connection, it is an advantage if, in the third operating mode, the mobile unit automatically searches for electrical locking members that are registered in a second memory member included in each mobile unit, when the mobile unit finds at least one electrical locking member within a predetermined distance, d, from the mobile unit, the locking member/members found being unlocked or the same being locked.

An additional advantage, in this connection, is if a user of a mobile unit can send an SMS message comprising an erasure code to the mobile unit, the user code being erased in the mobile unit.

In this connection, it is an advantage if, before a mobile unit can unlock or lock an electrical locking member, the mobile unit and the electrical locking member have to be paired together by the fact that link and encryption keys are created, which pair information is saved in a third, persistent memory member connected to the first communication member.

An additional advantage, in this connection, is if each mobile unit comprises a mobile telephone or a hand-held computer.

In this connection, it is an advantage if the first communication member, the first memory member and the third memory member are integrated in the electrical locking member or are arranged in a change-over switch connected to each locking member in order to enable opening of the electrical locking member from inside.

An additional advantage, in this connection, is if a key member can comprise a stationary unit.

A method according an aspect of the present invention is carried out by means of a locking system comprising at least one electrical locking member, each of which intended for a door/garage door or the like and at least one key member in the form of a programmable, mobile unit, for wireless unlocking or locking of one or more electrical locking members. The method comprises the steps of:

- a second communication member included in the mobile unit and intended for wireless communication over short distances encryptedly transmitting an address unique to the mobile unit to a first communication member associated with the electrical locking member and intended for wireless communication over short distances;
- the second communication member encryptedly transmitting an authorized user code to the first communication member; and
- said electrical locking member being unlocked or locked.

A significant advantage of this method according to the present invention is that the use of a great number of metal keys and/or passes is abolished. Furthermore, the use of a great number of codes is avoided.

In this connection, it is an advantage if the method comprises the steps of:

a second communication member included in the mobile unit and intended for wireless communication over short distances encryptedly transmitting an address unique to the mobile unit to a first communication member associated with the electrical locking member and intended for wireless communication over short distances;

the second communication member encryptedly transmitting an authorized user code to the first communication member; and said electrical locking member being unlocked or locked.

An additional advantage, in this connection, is if the method furthermore comprises the steps of:

storing the unique addresses of the mobile units as well as authorized user codes in a central processing unit connected to each electrical locking member; and the central processing unit deciding about and informing the locking members when they should be opened or locked.

In this connection, it is an advantage if the method furthermore comprises the step of:

storing the unique addresses of the mobile units as well as authorized user codes in first memory members each of which connected to the first communication member.

An additional advantage, in this connection, is if the method furthermore comprises the steps of:

comparing agreement between address as well as user code received from the second communication member and address as well as user code in the first memory member; and if agreement is established, unlocking or locking the electrical locking member.

In this connection, it is an advantage if the first and the second communication member, respectively, communicate by means of Bluetooth technology.

An additional advantage, in this connection, is if the method furthermore comprises the step of:

by means of a selecting member included in each mobile unit selecting one of three different operating modes of said mobile unit.

In this connection, it is an advantage if, in the first operating mode, the method furthermore comprises the steps of:

the mobile unit searching for electrical locking members;

if more than one electrical locking member is registered in a second memory member included in each mobile unit, displaying a list comprising registered electrical locking members; and the user from this list selecting which electrical locking member that should be unlocked or locked.

An additional advantage, in this connection, is if, in the second operating mode, the method furthermore comprises the steps of:

the mobile unit automatically searching for electrical locking members that are registered in a second memory member included in each mobile unit at a predetermined time interval, T; and when the mobile unit finds at least one electrical locking member within a predetermined distance, d, from the mobile unit, on a display member, displaying a question if the locking member/members found should be unlocked or locked.

In this connection, it is an advantage if the method furthermore comprises the steps of:

the mobile unit automatically searching for electrical locking members that are registered in a second memory member included in each mobile unit; and when the mobile unit finds at least one electrical locking member within a predetermined distance, d, from the mobile unit, unlocking or locking the locking member/members found.

An additional advantage in the method furthermore comprises the steps of:

the user of a mobile unit sending an erasure code to the mobile unit; and the user code being erased in the mobile unit.

In this connection, it is an advantage if, in the third operating mode, the method furthermore comprises the steps of:

the mobile unit automatically searching for electrical locking members that are registered in a second memory member included in each mobile unit; and when the mobile unit finds at least one electrical locking member within a predetermined distance, d, from the mobile unit, unlocking or locking the locking member/members found.

An additional advantage, in this connection, is if a key member can comprise a stationary unit.

A significant advantage of this computer software product according to the present invention is that the use of a great number of metal keys and/or passes is abolished. Furthermore, the use of a great number of codes is avoided.

BRIEF DESCRIPTION OF THE DRAWINGS

Embodiments of the invention will now be described, reference being made to the accompanying drawings, where.

DETAILED DESCRIPTION

Figure 1:
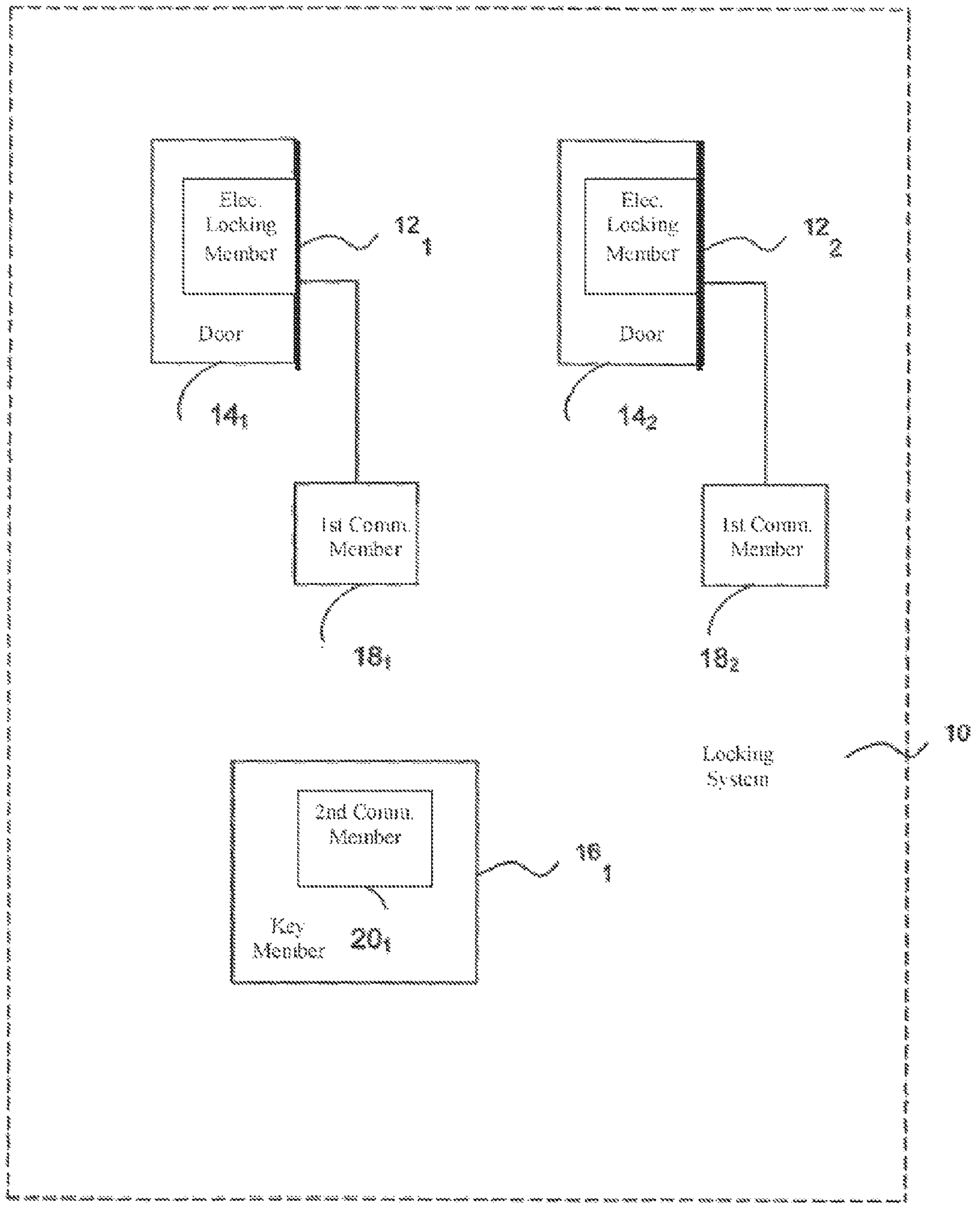
FIG. 1 shows a block diagram of a first embodiment of a locking system according to the present invention.

In FIG. 1, a block diagram of a locking system 10 according to the present invention is shown. In FIG. 1, a locking system 10 comprising two electrical locking members $\mathbf{12}_1$ and $\mathbf{12}_2$ is shown, each of which intended for a door/garage door $\mathbf{14}_1$ and $\mathbf{14}_2$, respectively. It should be pointed out that the locking system 10 may comprise n electrical locking members $\mathbf{12}_n$ and doors $\mathbf{14}_n$, where n is an integer and $n \geqq 1$. Furthermore, the locking system 10 comprises a key member $\mathbf{16}_1$. It should be pointed out that the locking system 10 may comprise m key members $\mathbf{16}_m$, where m is an integer and $m \geqq 1$. Each electrical locking member $\mathbf{12}_1$ and $\mathbf{12}_2$ is associated with, in this case connected to, a first communication member $\mathbf{18}_1$ and $\mathbf{18}_2$ for wireless communication over short distances. The key member $\mathbf{16}_1$ comprises a programmable, mobile unit $\mathbf{16}_1$, comprising a second communication member $\mathbf{20}_1$ for wireless communication over short distances. An electrical locking member $\mathbf{12}_1$ or $\mathbf{12}_2$ is unlocked or locked by the mobile unit $\mathbf{16}_1$ by means of the second communication member $\mathbf{20}_1$ encryptedly transmitting an address unique to the mobile unit $\mathbf{16}_1$, as well as an authorized user code to the first communication member $\mathbf{18}_1$ or $\mathbf{18}_2$. In this example, the mobile unit $\mathbf{16}_1$ may be used to unlock the two locking members $\mathbf{12}_1$ and $\mathbf{12}_2$ without the usage of metal keys and/or passes with appurtenant codes.

Figure 2:
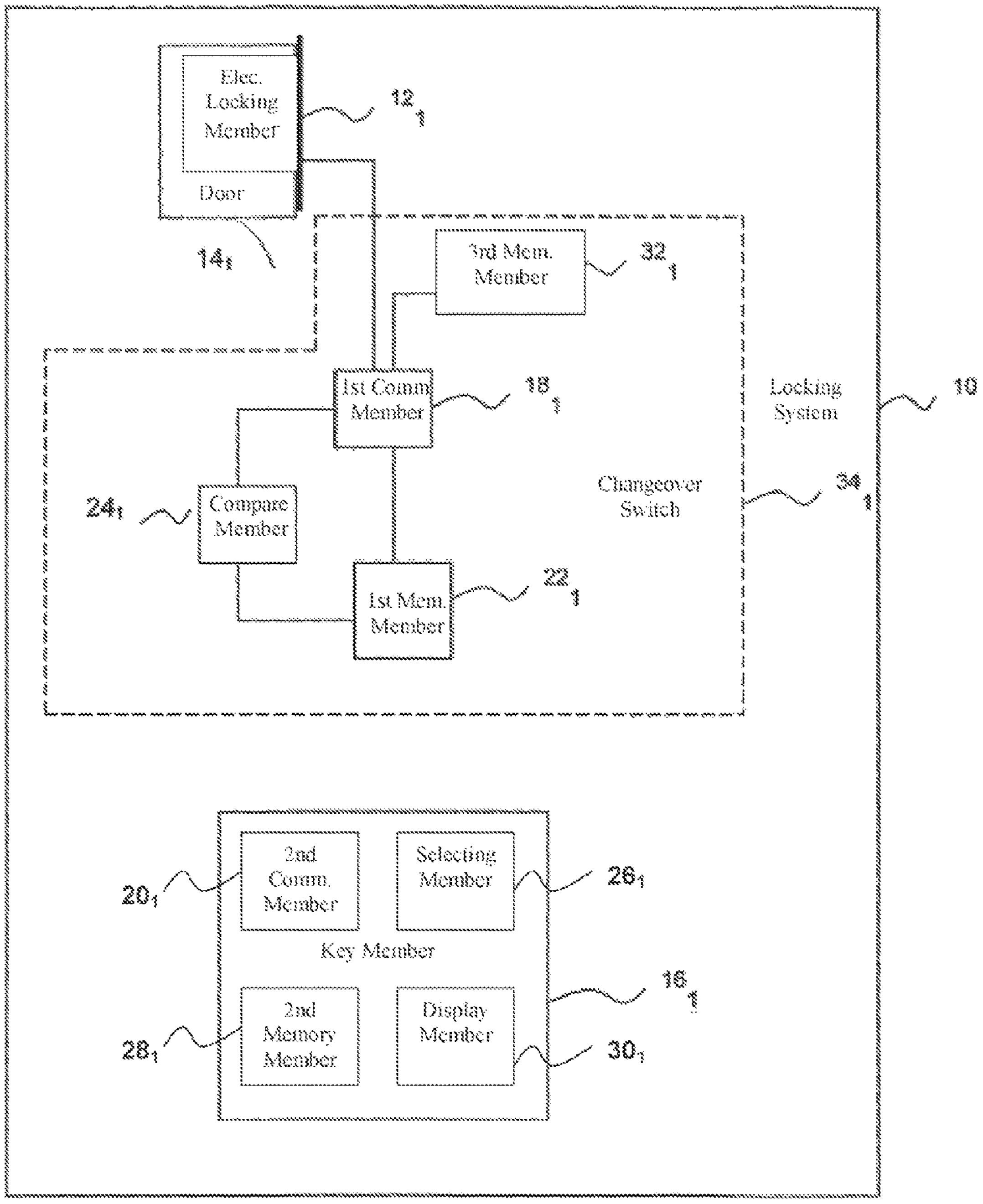
FIG. 2 shows a more detailed block diagram of the locking system shown in FIG. 1.

In FIG. 2, a more detailed block diagram is shown of the locking system 10 according to the present invention shown in FIG. 1. In this example, for the sake of simplicity, the locking system 10 comprises only one electrical locking member $\mathbf{12}_1$ intended for a door/garage door $\mathbf{14}_1$ or the like. For the same reason, the locking system 10 comprises only one key member $\mathbf{16}_1$ in the form of a programmable, mobile unit $\mathbf{16}_1$. The locking system 10 comprises, in correspondence with FIG. 1, furthermore a first communication member $\mathbf{18}_1$, associated with, in this case connected to, the electrical locking member $\mathbf{12}_1$. The locking system 10 comprises furthermore a second communication member $\mathbf{20}_1$ included in the mobile unit $\mathbf{16}_1$. As may be seen in FIG. 2, the first communication member $\mathbf{18}_1$ is connected to a first memory member $\mathbf{22}_1$ for the storage of the unique address of the mobile unit $\mathbf{16}_1$ as well as authorized user code. The locking system 10 comprises furthermore a comparing member $\mathbf{24}_1$ connected to the first communication member $\mathbf{18}_1$ and the first memory member $\mathbf{22}_1$, for the comparison of the agreement between address received from the second communication member $\mathbf{20}_1$ as well as user code stored in the first memory member $\mathbf{22}_1$.

If agreement is established, the electrical locking member $\mathbf{12}_1$ is opened. Otherwise, the electrical locking member $\mathbf{12}_1$ remains in locked state.

According to another embodiment of the locking system 10 according to the present invention, the locking system 10 comprises a central processing unit connected to each electrical locking member ($\mathbf{12}_1, \ldots, \mathbf{12}_n$). The central processing unit (not shown) comprises a memory member for the storage of the unique addresses of the mobile units ($\mathbf{16}_1, \ldots, \mathbf{16}_m$) as well as authorized user codes. In this solution, the locking members ($\mathbf{12}_1, \ldots, \mathbf{12}_n$) only work as so-called token stations between the mobile units ($\mathbf{16}_1, \ldots, \mathbf{16}_m$) and the central processing unit, which decides if and informs when a locking member ($\mathbf{12}_1, \ldots, \mathbf{12}_n$) should be opened or locked.

Furthermore, the mobile unit $\mathbf{16}_1$ comprises a selecting member $\mathbf{26}_1$ operable to enable the selection of one of three different operating modes of the mobile unit $\mathbf{16}_1$. The mobile unit $\mathbf{16}_1$ comprises furthermore a second memory member $\mathbf{28}_1$ for the storing of registered locking members $\mathbf{12}_1$. The mobile unit $\mathbf{16}_1$ comprises furthermore a display member $\mathbf{30}_1$ in order to, for instance, display a list of registered locking members $\mathbf{12}_1$ if more than one locking member is registered on the mobile unit $\mathbf{16}_1$, i.e., may be unlocked or locked by the mobile unit $\mathbf{16}_1$ in question.

The locking system 10 shown in FIG. 2 comprises furthermore a third memory member $\mathbf{32}_1$ connected to the first communication member $\mathbf{18}_1$ for the storing of pair information, i.e., link and encryption keys so that the mobile unit $\mathbf{16}_1$ and the electrical locking member $\mathbf{12}_1$, in the form of the first communication member $\mathbf{18}_1$, should be able to communicate safely. This means that this pairing together has to take place before a mobile unit $\mathbf{16}_1$ can unlock or lock an electrical locking member $\mathbf{12}_1$.

In the locking system 10 shown in FIG. 2, the first communication member $\mathbf{18}_1$, the first memory member $\mathbf{22}_1$, the third memory member $\mathbf{32}_1$ and the comparing member $\mathbf{24}_1$ are arranged/integrated in a change-over switch $\mathbf{34}_1$ connected to the locking member $\mathbf{12}_1$, which switch is used to open the electrical locking member $\mathbf{12}_1$ from inside.

According to another embodiment, not shown, these members $\mathbf{18}_1$, $\mathbf{22}_1$, $\mathbf{24}_1$ and $\mathbf{32}_1$ are integrated in the electrical locking member $\mathbf{12}_1$.

According to a preferred embodiment of the locking system 10, the first and the second communication member, $\mathbf{18}_1$ and $\mathbf{20}_1$, respectively, communicate by means of Bluetooth technology. The locking system 10 may, in this connection, identify a user by means of the Bluetooth address thereof. The Bluetooth technology uses a frequency hopping technique. The frequency hops 1600 times/s and 79 channels are available. The Bluetooth technology also offers 128 bits encryption.

The locking member $\mathbf{12}_1$ is silent except from responding to direct connection enquiries. Thus, the locking member $\mathbf{12}_1$ is not seen upon a Bluetooth scanning of the area. Only the one who knows the Bluetooth address of the locking member $\mathbf{12}_1$ can communicate with the locking member $\mathbf{12}_1$ in question.

According to a preferred embodiment of the locking system 10, a user of a mobile unit $\mathbf{16}_1, \ldots, \mathbf{16}_m$ may send an SMS message comprising an erasure code to the mobile unit $\mathbf{16}_1, \ldots, \mathbf{16}_m$, the user code being erased in the mobile unit $\mathbf{16}_1, \ldots, \mathbf{16}_m$. This prevents any unauthorised from using a found mobile unit $\mathbf{16}_1, \ldots, \mathbf{16}_m$ in order to unlock an electrical locking member $\mathbf{12}_1, \ldots, \mathbf{12}_n$.

According to a preferred embodiment of the locking system 10, a key member $\mathbf{16}_1$ may comprise a stationary unit, such as a personal computer.

The function of the locking system 10 shown in FIGS. 1 and 2 will be described closer in connection with the description of FIGS. 3-6.

Figure 3:
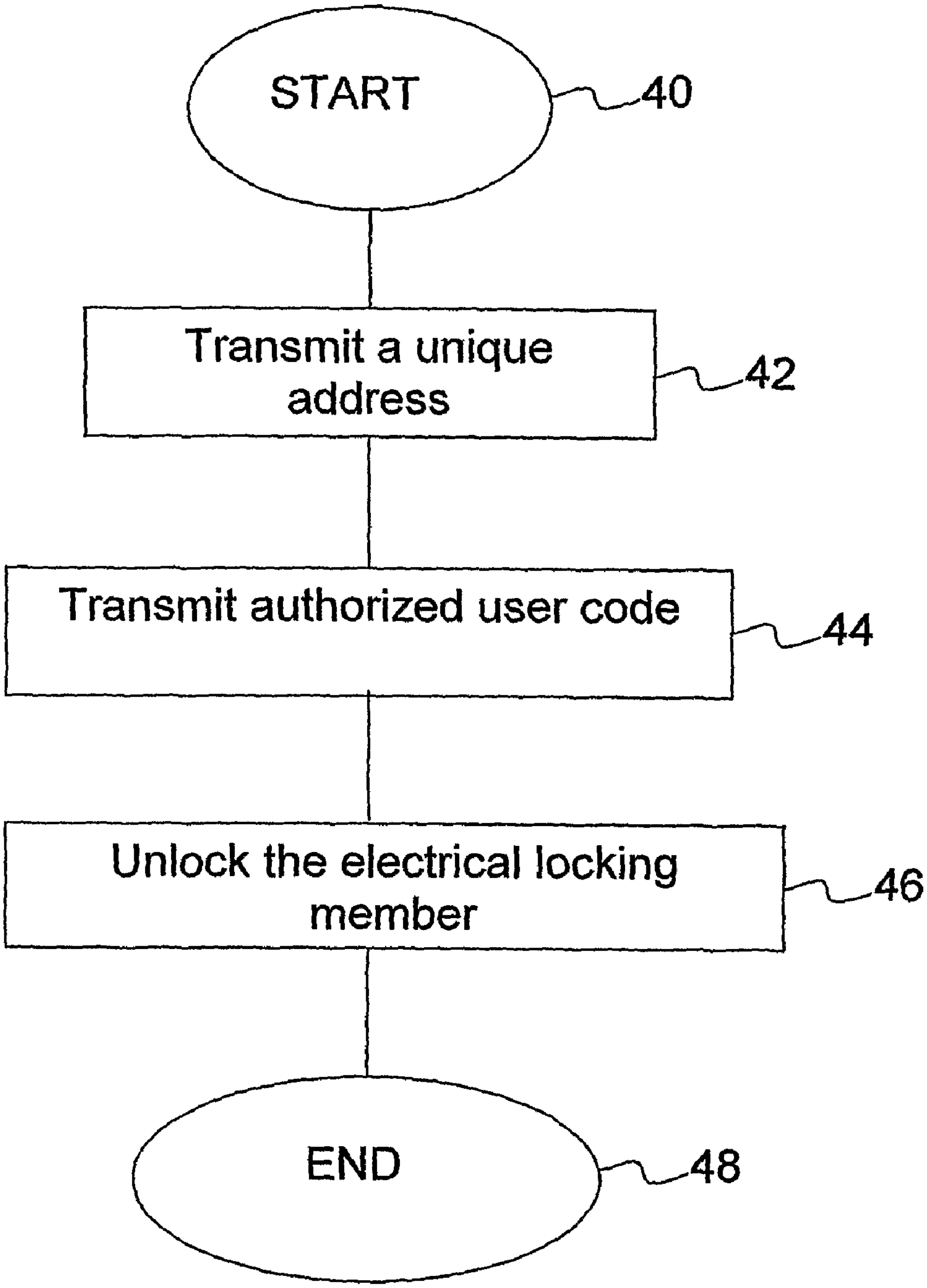
FIG. 3 shows a flow chart of a method for wireless unlocking or locking of one or more locking members according to the present invention.

In FIG. 3, a flow chart is shown of a method for wireless unlocking or locking of one or more locking members $\mathbf{12}_1$ (compare FIGS. 1 and 2) according to the present invention. The method begins at block 40. The method then continues, at block 42, with the step of: a second communication member $\mathbf{20}_1$, included in the mobile unit $\mathbf{16}_1$, encryptedly transmitting a unique address of the mobile unit $\mathbf{16}_1$ to the first communication member $\mathbf{18}_1$. Next, the method continues, at block 44, with the step of: the second communication member $\mathbf{20}_1$ encryptedly transmitting a user code to the first communication member $\mathbf{18}_1$. If the user code is authorized, the method continues, at block 46, with the step of: the electrical locking member being unlocked or locked. The method is terminated at block 48.

According to a preferred embodiment of the method, it furthermore comprises the step of: storing the unique address/addresses as well as authorized user codes of the mobile unit/units in the first memory member $\mathbf{22}_1$.

According to another preferred embodiment of the method, it furthermore comprises the steps of:

storing the unique addresses of the mobile units ($\mathbf{16}_1, \ldots, \mathbf{16}_m$) as well as authorized user codes in a central processing unit connected to each electrical locking member ($\mathbf{12}_1, \ldots \mathbf{12}_n$); and the central processing unit deciding about and informing the locking members ($\mathbf{12}_1, \ldots \mathbf{12}_n$); and the central processing unit deciding about and informing the locking members ($\mathbf{12}_1, \ldots, \mathbf{12}_n$) when they should be opened or locked.

According to an additional preferred embodiment of the method, it furthermore comprises the steps of: comparing agreement between address as well as user code received from the second communication member $\mathbf{20}_1$ and address as well as user code stored in the first memory member $\mathbf{22}_1$. If agreement is established, the electrical locking member $\mathbf{12}_1$ is unlocked. Otherwise, if agreement is not established, no unlocking of the locking member $\mathbf{12}_1$ is carried out.

According to a preferred embodiment of the method, it furthermore comprises the step of: by means of the selecting member $\mathbf{26}_1$ selecting one of three operating modes that the mobile unit $\mathbf{16}_1$ may operate in. These three operating modes will be described below in connection with FIGS. 4-6.

Figure 4:
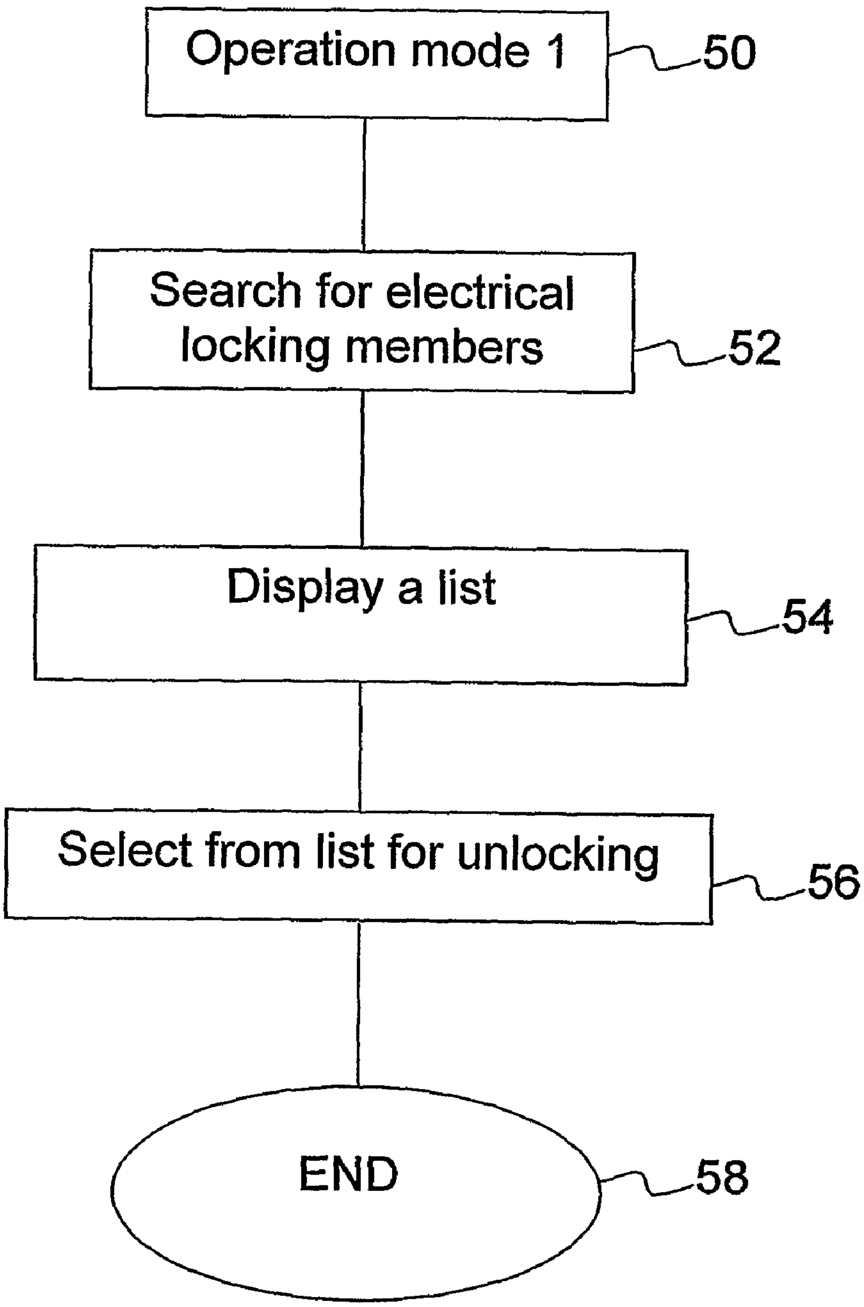
FIG. 4 shows a flow chart illustrating when the mobile unit operates in the first operating mode.

In FIG. 4, a flow chart is shown that illustrates when the mobile unit $\mathbf{16}_1$ operates in the first operating mode, block 50. The method then continues, at block 52, with the step of: the mobile unit $\mathbf{16}_1$ searching for electrical locking members $\mathbf{12}_1, \ldots, \mathbf{12}_n$. Next, the method continues, at block 54, with the step of: if more than one electrical locking member $\mathbf{12}_1, \ldots, \mathbf{12}_n$ is registered in the second memory member $\mathbf{28}_1$, displaying a list on the display member $\mathbf{30}_1$ comprising registered locking members $\mathbf{12}_1, \ldots, \mathbf{12}_n$. The method then continues, at block 56, with the step of: the user selecting which electrical locking member $\mathbf{12}_1$ that should be unlocked or locked from this list. The method is terminated at block 58.

Figure 5:
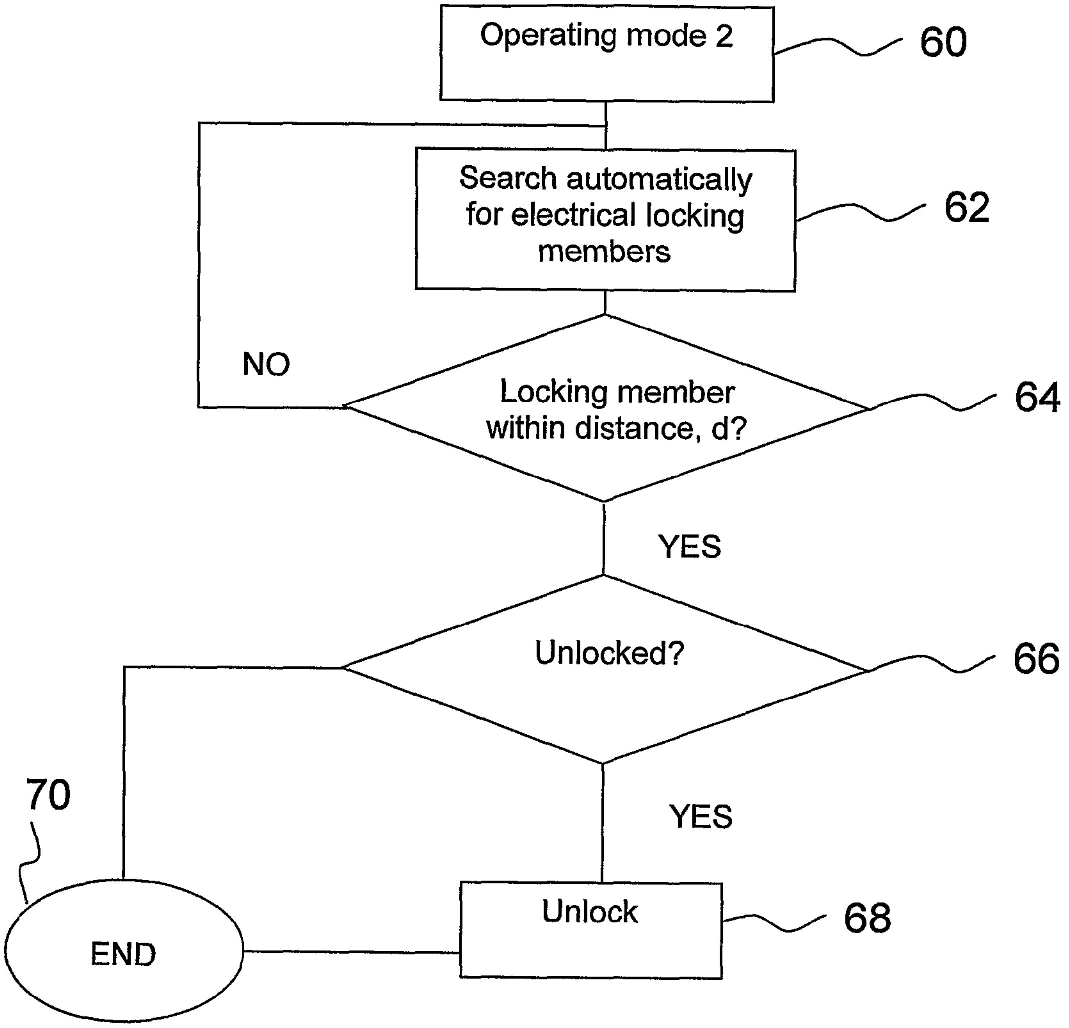
FIG. 5 shows a flow chart illustrating when the mobile unit operates in the second operating mode.

In FIG. 5, a flow chart is shown that illustrates when the mobile unit $\mathbf{16}_1$ operates in the second operating mode, block 60. The method then continues, at block 62, with the step of: the mobile unit $\mathbf{16}_1$ automatically searching for electrical locking members $\mathbf{12}_1, \ldots, \mathbf{12}_n$ that are registered in the second memory member $\mathbf{28}_1$ at a predetermined time interval, T. Next, the method continues, at block 64, by asking the question whether at least one locking member $\mathbf{12}_1, \ldots, \mathbf{12}_n$, is present within a predetermined distance, d, from the mobile unit $\mathbf{16}_1$. If the answer to this question is negative, the step according to block 62 is executed again. However, if the answer is affirmative, the method continues at block 66, by asking the question if the locking member/members $\mathbf{12}_1, \ldots, \mathbf{12}_n$ found should be unlocked or locked? If the answer to this question is negative, the method is terminated at block 70. However, if the answer is affirmative, the method continues, at block 68, with the step of: unlocking or locking the locking member/members $\mathbf{12}_1, \ldots, \mathbf{12}_n$, in question. Then, the method is terminated at block 70.

Figure 6:
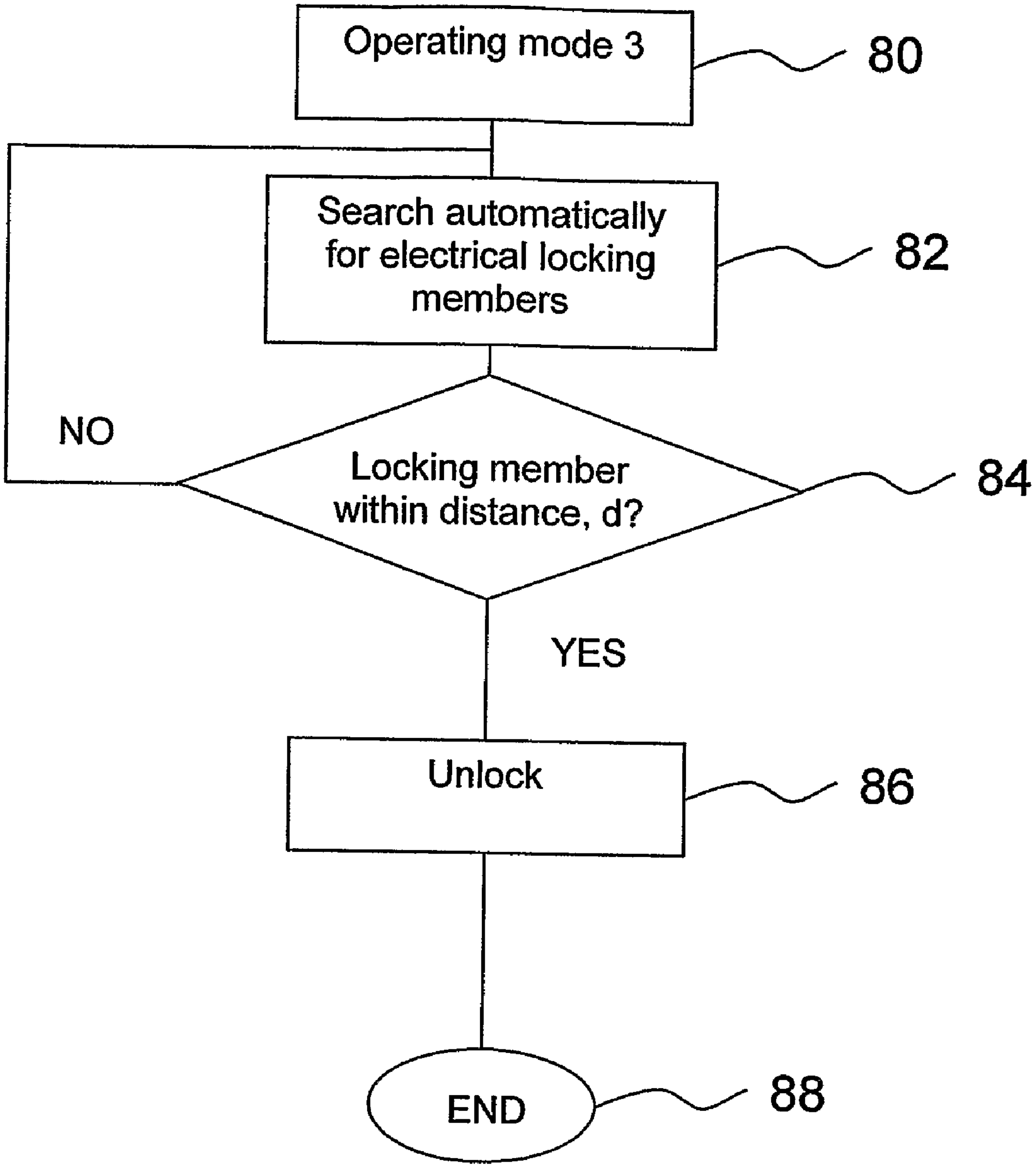
FIG. 6 shows a flow chart illustrating when the mobile unit operates in the third operating mode.

In FIG. 6, a flow chart is shown that illustrates when the mobile unit $\mathbf{16}_1$ operates in the third operating mode, block 80. The method then continues, at block 82, with the step of: the mobile unit $\mathbf{16}_1$ automatically searching for electrical locking members $\mathbf{12}_1, \ldots, \mathbf{12}_n$, that are registered/stored in the second memory member $\mathbf{28}_1$. Next, the method continues, at block 84, by asking the question if a locking member $\mathbf{12}_1, \ldots, \mathbf{12}_n$ is present within a predetermined distance, d, from the mobile unit $\mathbf{16}_1$. If the answer to this question is negative, the step according to block 82 is executed again. However, if the answer is affirmative, the method continues, at block 86, with the step of unlocking or locking the locking member/members $\mathbf{12}_1, \ldots, \mathbf{12}_n$ found. The method is then terminated at block 88.

According to a preferred embodiment of the method, it furthermore comprises the step of: pairing together a mobile unit $\mathbf{16}_1$ and an electrical locking member $\mathbf{12}_1$ by the fact that link and encryption keys are saved, which pair information is stored/saved in the third memory member $\mathbf{32}_1$, which is persistent.

Figure 7:
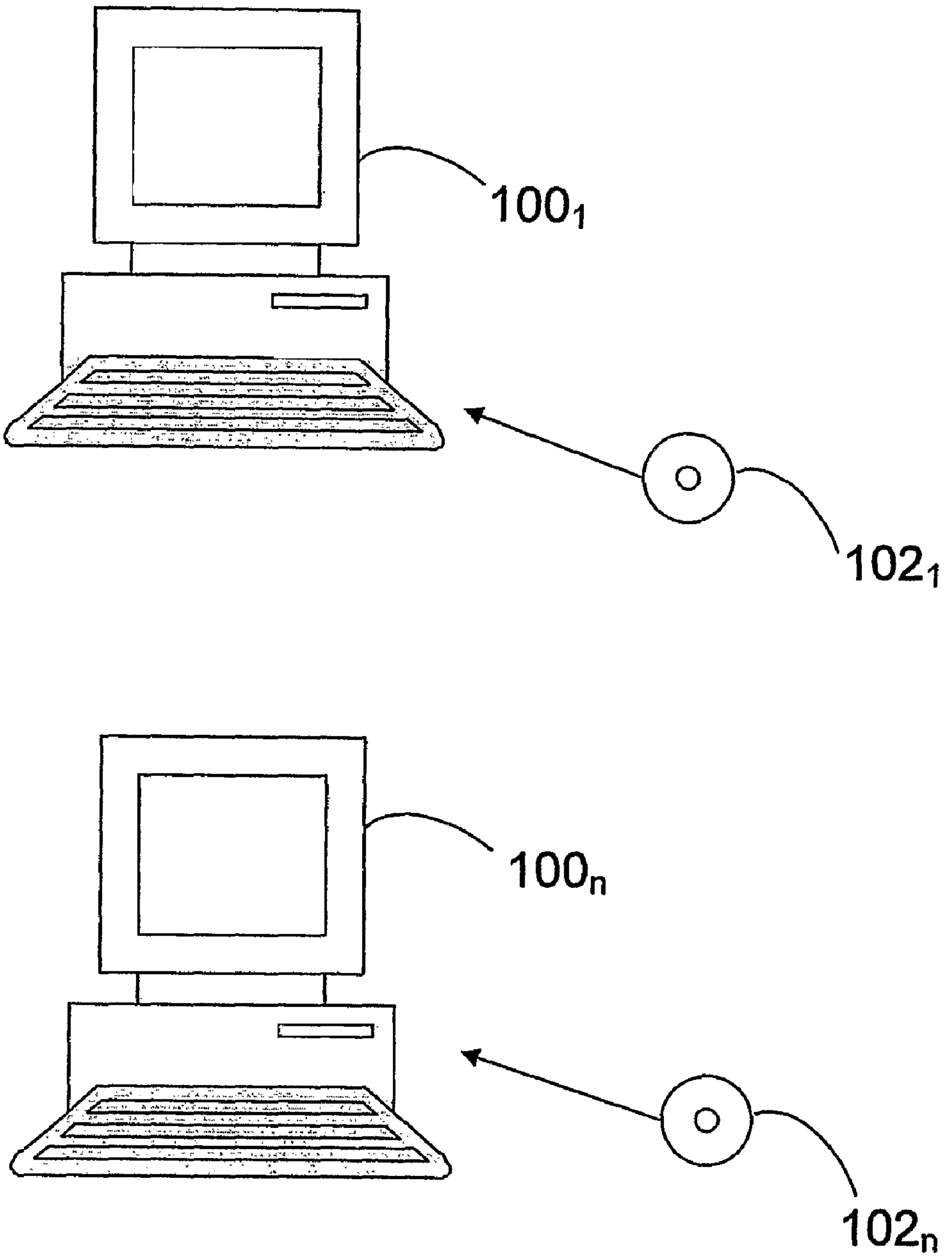
FIG. 7 schematically shows a number of computer software products according to the present invention.

According to a preferred embodiment of the method, it furthermore comprises the steps of:

the user of a mobile unit $\mathbf{16}_1, \ldots, \mathbf{16}_m$ sending an erasure code to the mobile unit $\mathbf{16}_1, \ldots, \mathbf{16}_m$; and the user code being erased in the mobile unit $\mathbf{16}_1, \ldots, \mathbf{16}_m$ In FIG. 7, some computer software products $\mathbf{102}_1, \ldots, \mathbf{102}_n$ according to the present invention are schematically shown. In FIG. 7, n different digital computers $\mathbf{100}_1, \ldots, \mathbf{100}_n$ are shown, where n is an integer. In FIG. 7, n different computer software products $\mathbf{102}_1, \ldots, \mathbf{102}_n$ are shown, here shown in the form of CD discs. They different computer software products $\mathbf{102}_1, \ldots, \mathbf{102}_n$ are directly loadable in the internal memory of the n different digital computers $\mathbf{100}_1, \ldots, \mathbf{100}_n$. Each computer software product $\mathbf{102}_1, \ldots, \mathbf{102}_n$ comprises software code portions for executing a part of or all the steps according to FIG. 3 when the product/products $\mathbf{102}_1, \ldots, \mathbf{102}_n$ are run on said computer $\mathbf{100}_1, \ldots, \mathbf{100}_n$. The computer software products $\mathbf{102}_1, \ldots, \mathbf{102}_n$ may, for instance, be in the form of diskettes, RAM discs, magnetic tapes, magneto-optical discs or some other suitable products.

The invention is not limited to the described embodiments. It will be evident for those skilled in the art that many different modifications are feasible within the scope of the following claims.

The invention claimed is:

1. Locking system comprising:

at least one electrical locking member for a door, the electrical locking member being associated with a first communication member for wireless communication over short distances;

at least one key member, the key member comprising a programmable, mobile unit comprising a second communication member for wireless communication over short distances;

a third, persistent memory member connected to the first communication member, the third memory member storing pair information comprising at least one link and encryption keys of at least the mobile unit paired together with at least the electrical locking member, the pair information allowing the mobile unit to unlock or lock the electrical locking member, the second communication member being adapted to transmit an encrypted address unique to the mobile unit and an authorized user code to the first communication member to unlock or lock the electrical locking member, wherein each mobile unit comprises a selecting member operable to select one of three different operating modes of the mobile unit, and wherein, in a second operating mode, the mobile unit is adapted to search, by means of the pair information, automatically for electrical locking members that are registered in a second memory member included in each mobile unit at a predetermined time interval when the mobile unit finds at least one electrical locking member within a predetermined distance from the mobile unit, the mobile unit being adapted to display on a display member included in each mobile unit a question if the locking member found should be unlocked or locked.

2. Locking system according to claim 1, comprising a central processing unit connected to the electrical locking member, the central processing unit comprising a memory member for storage of the unique address of the mobile unit and the authorized user code, and the central processing unit being adapted to provide a signal to unlock or lock the electrical locking member.

3. Locking system according to claim 1, wherein each first communication member is connected to a first memory member adapted to store the unique address of the mobile unit as well as the authorized user code.

4. Locking system according to claim 3, wherein each electrical locking member is associated with a comparing member connected to the first communication member and the first memory member and adapted to compare and confirm agreement between the unique address of the mobile unit and user code received from the second communication member with the address and user code in the first memory member.

5. Locking system according to claim 4, wherein the electrical locking member remains in a locked state when the comparing member does not establish agreement.

6. Locking system according to claim 1, wherein the first and second communication member, respectively, are adapted to communicate by means of Bluetooth technology.

7. Locking system according to claim 1, wherein, in a first operating mode, the mobile unit is adapted to search, by means of the pair information, for electrical locking members and, if more than one electrical locking member is registered in a second memory member included in each mobile unit, the first mobile unit is adapted to display a list on a display member included in each mobile unit, the first mobile unit being adapted to permit a user to select from the list which electrical locking member of the more than one electrical locking member should be unlocked or locked.

8. Locking system according to claim 1, wherein, in a third operating mode, the mobile unit is adapted to search, by means of the pair information, automatically for electrical locking members that are registered in a second memory member included in each mobile unit and, when the mobile unit finds at least one electrical locking member within a predetermined distance from the mobile unit, the mobile unit being adapted to unlock or lock the locking member.

9. Locking system according to claim 8, wherein the mobile unit is adapted to send an SMS message comprising an erasure code to the mobile unit, the user code being erased in the mobile unit.

10. Locking system according to claim 1, wherein each mobile unit comprises a mobile telephone or a hand-held computer.

11. Locking system according to claim 10, wherein each first communication member is connected to a first memory member adapted to store the unique address of the mobile unit as well as the authorized user code, and wherein the first communication member, the first memory member and the third memory member are integrated in the electrical locking member.

12. Locking system according to claim 10, wherein each first communication member is connected to a first memory member adapted to store the unique address of the mobile unit as well as the authorized user code, and wherein the first communication member, the first memory member and the third memory member are arranged in a change-over switch connected to each the locking member and arranged to enable opening of the electrical locking member from inside.

13. Locking system according to claim 1, wherein a key member comprises a stationary unit.

14. Method of using a locking system, the locking system comprising at least one electrical locking member for a door and at least one key member, the key member comprising a programmable, mobile unit, for wireless unlocking or locking of the electrical locking member, the method comprising:

storing pair information in a third persistent memory member connected to a first communication member associated with the electrical locking member, the pair information allowing a mobile unit to unlock or lock an electrical locking member;

transmitting an encrypted address unique to the mobile unit to the first communication member by a second communication member included in the mobile unit, the second communication member being adapted for wireless communication over short distances;

unlocking or locking the electrical locking in response to the transmitted unique address, selecting one of three different operating modes of the mobile unit by means of a selecting member included in each mobile unit, and in a second operating mode, the method comprises:

automatically searching with the mobile unit for electrical locking members that are registered in a second memory member included in each mobile unit at a predetermined time interval by means of the pair information; and when the mobile unit finds at least one electrical locking member within a predetermined distance from the mobile unit, displaying on a display member a question whether the at least one locking member should be unlocked or locked.

15. Method for wireless unlocking or locking of one or more electrical locking members according to claim 14, comprising:

storing at least one unique address of the mobile unit and at least one authorized user code in a central processing unit connected to each electrical locking member; and determining whether the electrical locking member should be unlocked or locked with the central processing unit and sending a signal from the central processing unit to unlock or lock the electrical locking member.

16. Method for wireless unlocking or locking of one or more electrical locking members according to claim 14, comprising:

storing at least one unique address of the mobile unit and at least one authorized user code in a first memory member connected to the first communication member.

17. Method for wireless unlocking or locking of one or more electrical locking members according to claim 16, comprising:

comparing agreement between address and user code received from the second communication member and address and user code in the first memory member; and unlocking or locking the electrical locking member if agreement is established.

18. Method for wireless unlocking or locking of one or more electrical locking members according to claim 14, wherein the first and second communication member, respectively, communicate by means of Bluetooth technology.

19. Method for wireless unlocking or locking or one or more electrical locking members according to claim 14, wherein, in a first operating mode, the method comprises:

searching for electrical locking members with the mobile unit by means of the pair information;

displaying a list comprising registered electrical locking members if more than one electrical locking member is registered in a second memory member included in each mobile unit; and selecting an electrical locking member to be unlocked or locked from the more than one electrical locking member.

20. Method for wireless unlocking or locking of one or more electrical locking members according to claim 14, wherein, in a third operating mode, the method comprises:

automatically searching with the mobile unit for electrical locking members that are registered in a second memory member included in each mobile unit by means of the pair information; and when the mobile unit finds at least one electrical locking member within a predetermined distance from the mobile unit, unlocking or locking at least one of the at least one electrical locking member found.

21. Method for wireless unlocking or locking of one or more electrical locking members according to claim 20, comprising:

sending an erasure code to the mobile unit; and erasing the user code in the mobile unit.

22. Method for wireless unlocking or locking of one or more electrical locking members according to claim 21, wherein the key member comprises a stationary unit.

23. At least one computer software product directly loadable in an internal memory of at least one digital computer, the computer software product comprising software code portions for executing the steps according to claim 14 when the computer software product is run on the at least one computer.

24. Locking system comprising:

at least one electrical locking member for a door, the electrical locking member being associated with a first communication member for wireless communication over short distances;

at least one key member, the key member comprising a programmable, mobile unit comprising a second communication member for wireless communication over short distances;

a third, persistent memory member connected to the first communication member, the third memory member storing pair information comprising at least one link and encryption keys of at least the mobile unit paired together with at least the electrical locking member, the pair information allowing the mobile unit to unlock or lock the electrical locking member, the second communication member being adapted to transmit an encrypted address unique to the mobile unit and an authorized user code to the first communication member to unlock or lock the electrical locking member, wherein the first and second communication member, respectively, are adapted to communicate by means of Bluetooth technology, wherein each mobile unit comprises a selecting member operable to select one of three different operating modes of the mobile unit, wherein, in a first operating mode, the mobile unit is adapted to search, by means of the pair information, for electrical locking members and, if more than one electrical locking member is registered in a second memory member included in each mobile unit, the first mobile unit is adapted to display a list on a display member included in each mobile unit, the first mobile unit being adapted to permit a user to select from the list which electrical locking member of the more than one electrical locking member should be unlocked or locked, wherein, in a second operating mode, the mobile unit is adapted to search, by means of the pair information, automatically for electrical locking members that are registered in a second memory member included in each mobile unit at a predetermined time interval when the mobile unit finds at least one electrical locking member within a predetermined distance from the mobile unit, the mobile unit being adapted to display on a display member included in each mobile unit a question if the locking member found should be unlocked or locked, and wherein, in a third operating mode, the mobile unit is adapted to search, by means of the pair information, automatically for electrical locking members that are registered in a second memory member included in each mobile unit and, when the mobile unit finds at least one electrical locking member within a predetermined distance from the mobile unit, the mobile unit being adapted to unlock or lock the locking member.

25. Method of using a locking system, the locking system comprising at least one electrical locking member for a door and at least one key member, the key member comprising a programmable, mobile unit, for wireless unlocking or locking of the electrical locking member, the method comprising:

storing pair information in a third persistent memory member connected to a first communication member associated with the electrical locking member, the pair information allowing a mobile unit to unlock or lock an electrical locking member;

transmitting an encrypted address unique to the mobile unit to the first communication member by a second communication member included in the mobile unit, the second communication member being adapted for wireless communication over short distances; and unlocking or locking the electrical locking in response to the transmitted unique address, wherein the first and second communication member, respectively, communicate by means of Bluetooth technology, and the method comprising selecting one of three different operating modes of the mobile unit by means of a selecting member included in each mobile unit, wherein, in a first operating mode, the method comprises:

searching for electrical locking members with the mobile unit by means of the pair information;

displaying a list comprising registered electrical locking members if more than one electrical locking member is registered in a second memory member included in each mobile unit; and selecting an electrical locking member to be unlocked or locked from the more than one electrical locking member, in a second operating mode, the method comprises:

automatically searching with the mobile unit for electrical locking members that are registered in a second memory member included in each mobile unit at a predetermined time interval by means of the pair information; and when the mobile unit finds at least one electrical locking member within a predetermined distance from the mobile unit, displaying on a display member a question whether the at least one locking member should be unlocked or locked, and in the third operating mode, the method comprises:

automatically searching with the mobile unit for electrical locking members that are registered in a second memory member included in each mobile unit by means of the pair information; and when the mobile unit finds at least one electrical locking member within a predetermined distance from the mobile unit, unlocking or locking at least one of the at least one electrical locking member found.

* * * * *